United States Patent [19]

Winiasz

[11] Patent Number: 4,681,213

[45] Date of Patent: Jul. 21, 1987

[54] GRIPPER ASSEMBLY

[75] Inventor: Michael E. Winiasz, Lorain, Ohio

[73] Assignee: Harris Graphics Corporation, Melbourne, Fla.

[21] Appl. No.: 790,431

[22] Filed: Oct. 23, 1985

[51] Int. Cl.⁴ .............................................. B65G 47/86
[52] U.S. Cl. ................................ 198/803.9; 294/104; 294/116; 271/206
[58] Field of Search .......................... 198/470.1, 803.9; 271/82, 85, 204, 206, 268, 277; 294/104, 116, 119.4

[56] References Cited

U.S. PATENT DOCUMENTS

| | | | |
|---|---|---|---|
| 4,039,182 | 8/1977 | Reist et al. | 271/204 |
| 4,320,894 | 3/1982 | Reist et al. | 271/204 |
| 4,381,056 | 4/1983 | Eberle | 271/204 |

Primary Examiner—Joseph E. Valenza
Attorney, Agent, or Firm—Tarolli, Sundheim & Covell

[57] ABSTRACT

A gripper assembly includes a movable clamp member which is rotatable relative to a stationary clamp member from a fully open position to any one of a plurality of closed positions to grip an article of a selected size between clamp members. When a releasable clutch or retainer assembly is in an engaged condition, the clutch prevents rotation of the movable clamp member from any one of the closed positions back to the fully open position. An actuator assembly is operable to release the clutch to enable the movable clamp member to rotate back to the fully open position. The clutch includes a coil spring having a plurality of turns which grip surfaces connected with the stationary and movable clamp members when the clutch is in the engaged condition. The actuator assembly operates the clutch from the engaged condition to the release condition by applying a force to the turns of the coil spring urging the turns to flex in a direction tending to increase the diameter of the coil spring.

11 Claims, 8 Drawing Figures

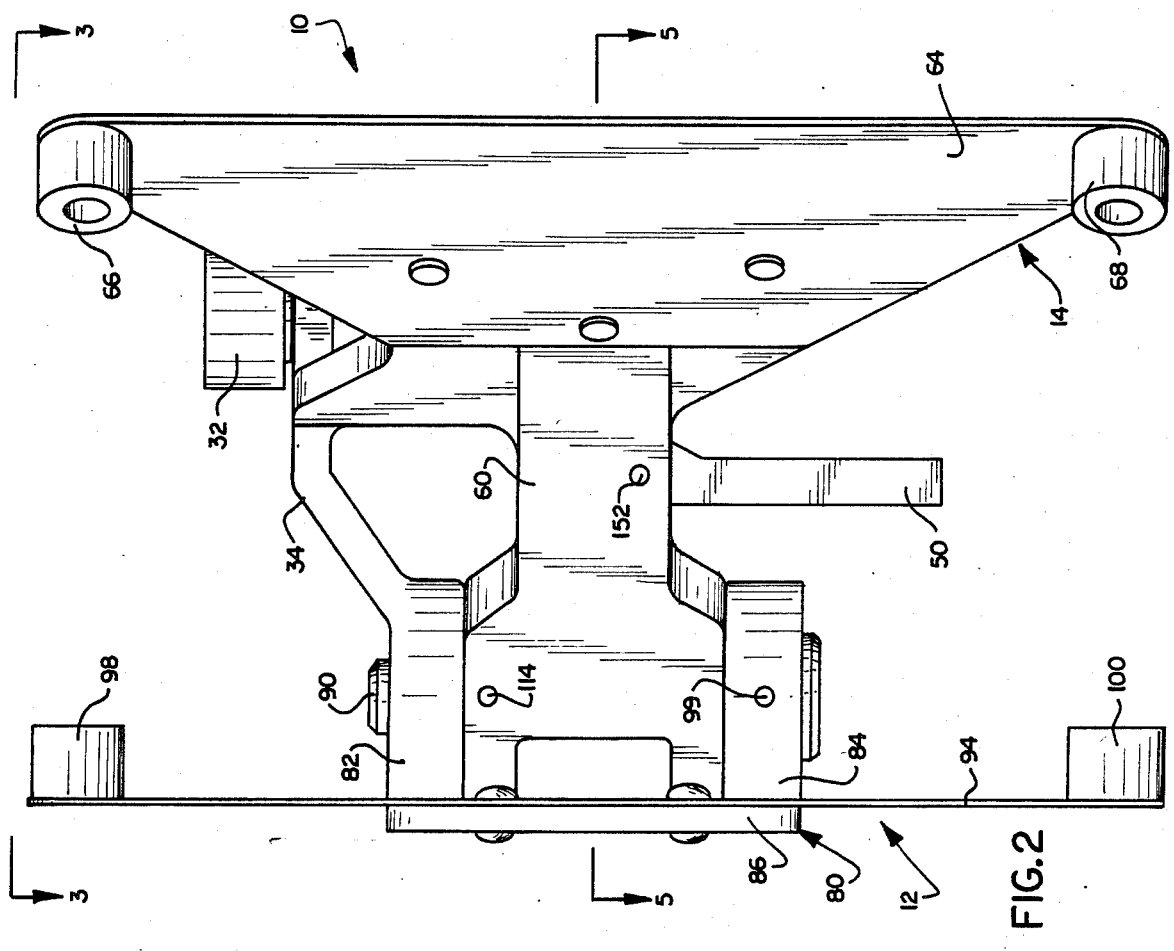
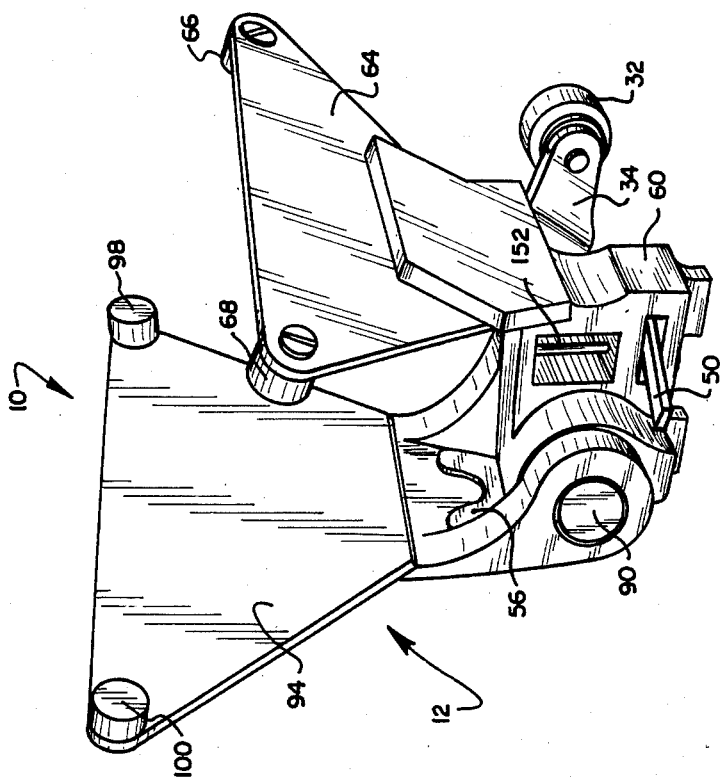
FIG.2
FIG.1

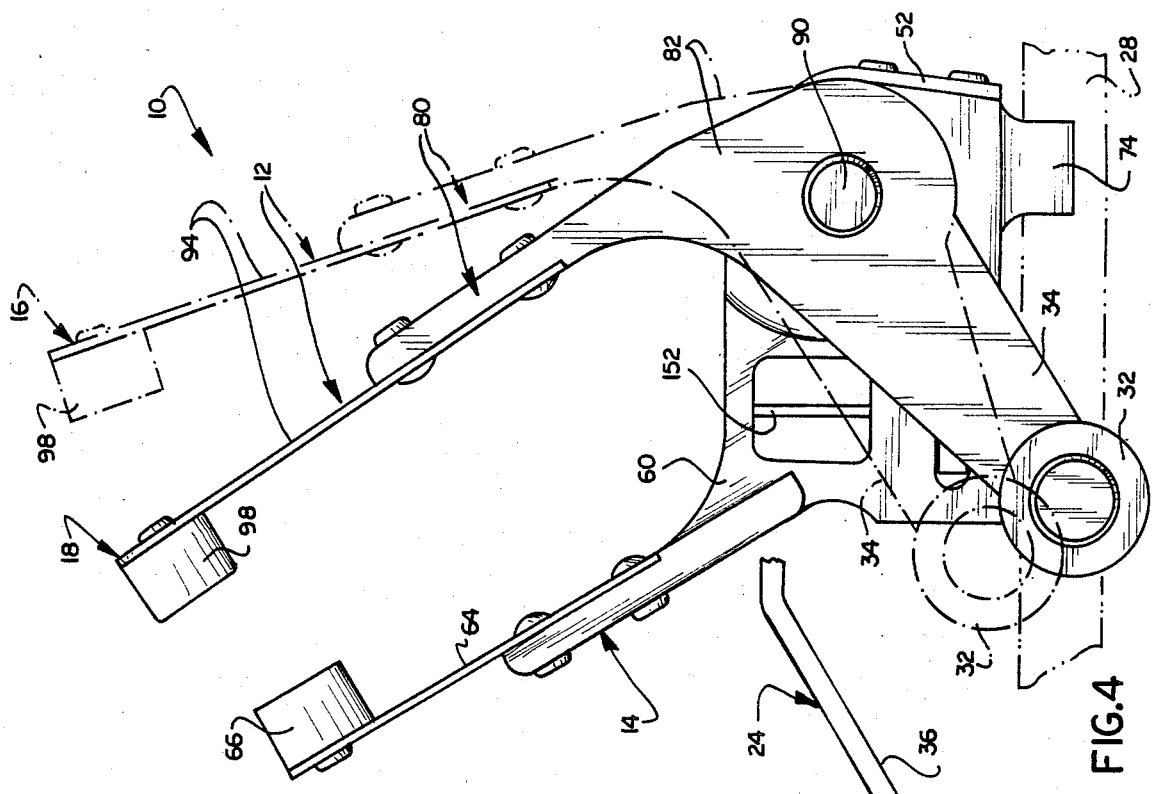
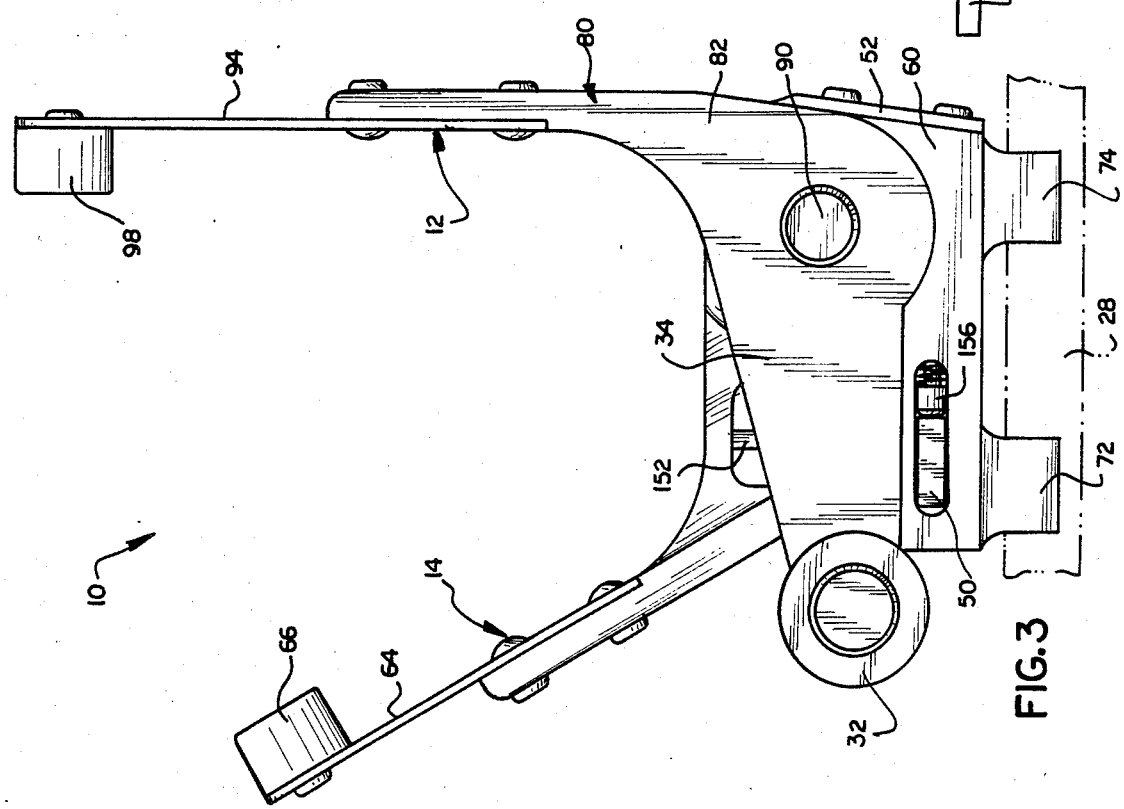

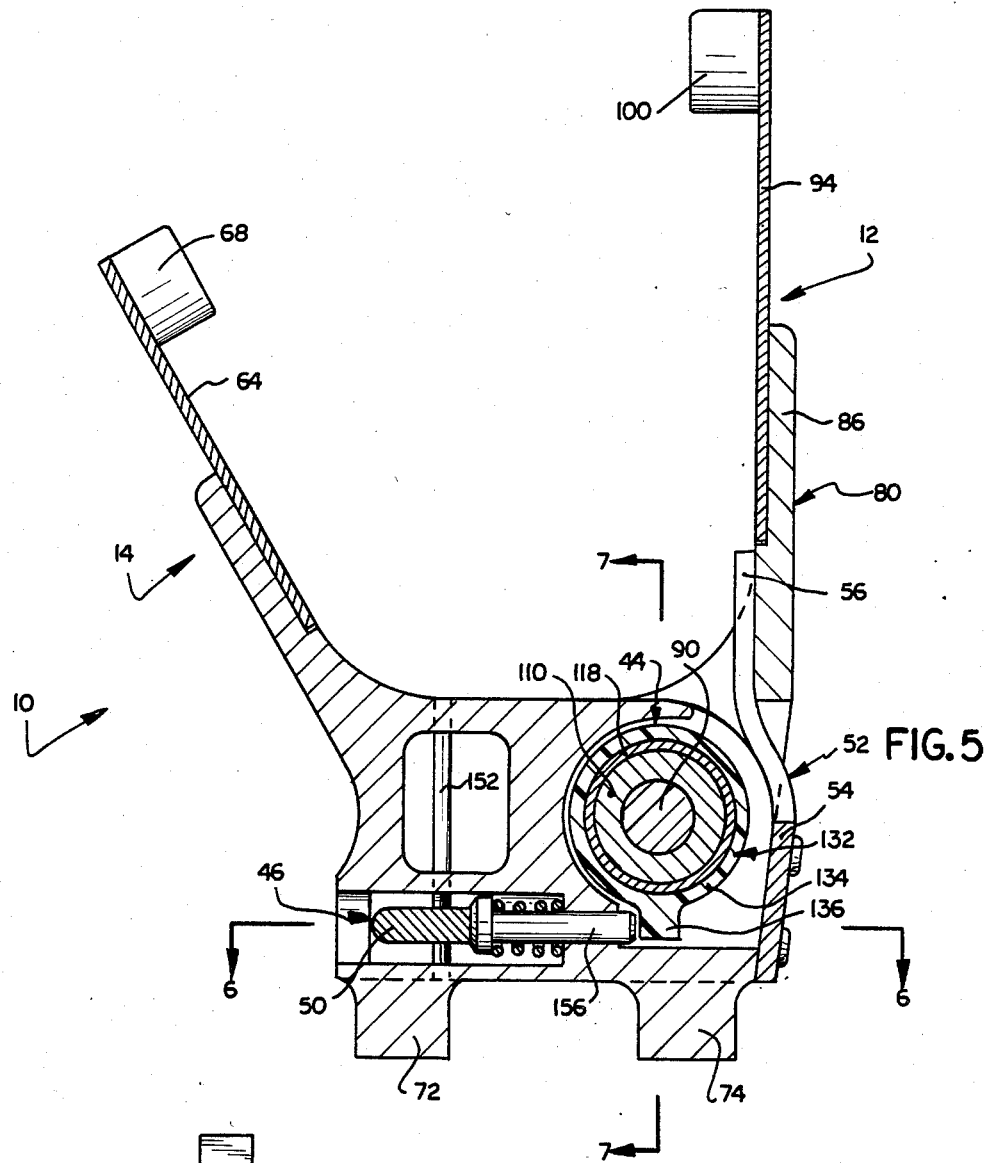
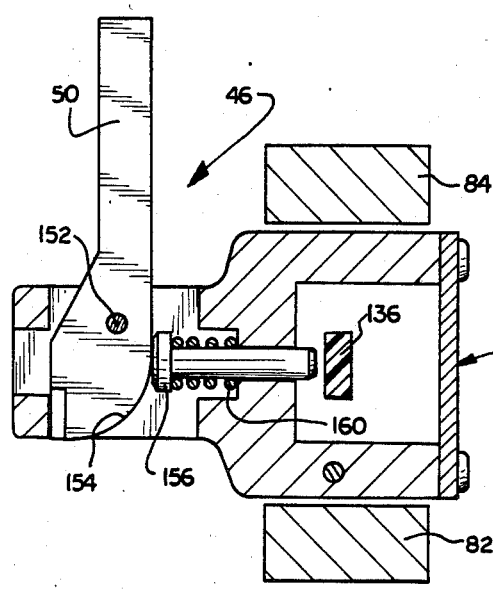

GRIPPER ASSEMBLY

BACKGROUND OF THE INVENTION

The present invention relates to a gripper assembly and more particularly to a gripper assembly which is operable between a fully open position and any one of a plurality of closed positions to enable the gripper assembly to grip articles of different sizes.

A known gripper assembly for gripping sheet material articles, such as a newspaper, is disclosed in U.S. Pat. No. 4,381,056. The gripper assembly disclosed in this patent has a movable clamp member or tongue which is held in clamping engagement with an article by a pawl arrangement. The pawl arrangement includes a wheel which is connected to the movable clamp member. After the wheel has been rotated to a predetermined position, a pawl engages a gap in the wheel to hold the gripper in clamping engagement with an article. In order to enable the pawl to engage the gap, the wheel must be rotated to the same position each time an article is to be gripped.

The gripper assembly disclosed in U.S. Pat. No. 4,381,056 may be used to grip newspapers. Newspapers may have outer sections formed of a relatively rough paper which is easy to grip and an inner section formed of a relatively smooth paper. Due to the low coefficient of friction of the surface of the inner section of the newspaper, the inner section of the newspaper may tend to slip out of the outer section of the newspaper while the newspaper is held by a gripper assembly.

SUMMARY OF THE INVENTION

The present invention relates to a gripper assembly having a releasable clutch which prevents rotation of a movable clamp member from any one of a plurality of closed positions to a fully open position. The clutch is operated from an engaged condition to a release condition by an actuator assembly. When the clutch is in the release condition, the movable clamp member is rotatable from any one of the plurality of closed positions back toward the fully open position.

The clutch includes a coil spring which allows the movable clamp member to rotate in a direction away from the fully open position to any one of a plurality of closed positions. When the movable clamp member has been rotated to a closed position, turns of the coil spring grip a surface connected with the movable clamp member to hold it against movement back toward the fully open position. When an engaged article is to be released, the actuator assembly applies a force to the spring in a direction tending to increase the size of the turns of the spring to thereby release the movable clamp member.

The movable and stationary clamp members both have resiliently deflectable gripper sections which flare outwardly from rigid base sections. To enable the gripper assembly to securely grip an article, such as a newspaper, clamping forces are concentrated at corner portions of the resilient gripper sections. This enables the gripper assembly to securely grip an article with a relatively large force at spaced apart locations on the article.

Accordingly, it is an object of this invention to provide a new and improved gripper assembly for clampingly gripping an article and wherein the gripper assembly includes a clamp member which is movable from a fully open position to any one of a plurality of closed positions and a clutch which is operable to maintain the clamp member in any one of the plurality of closed positions until the clutch is released.

Another object of this invention is to provide a new and improved gripper assembly as set forth in the preceding object and wherein the clutch includes a coil spring having turns which engage a surface connected with the movable clamp member to hold the movable clamp member against rotation back toward the fully open position once the movable clamp member has been moved to a selected one of a plurality of closed positions.

Another object of this invention is to provide a new and improved gripper assembly having resiliently deflectable gripper sections which can grip an article with clamping forces which are concentrated at spaced apart locations on the article.

BRIEF DESCRIPTION OF THE DRAWINGS

The foregoing and other objects and features of the present invention will become more apparent upon a consideration of the following description taken in connection with the accompanying drawings wherein:

FIG. 1 is a pictorial illustration of a gripper assembly constructed in accordance with the present invention;

FIG. 2 is an enlarged top plan view of the gripper assembly of FIG. 1 with movable and stationary clamp members in a fully open position;

FIG. 3 is a side elevational view, taken generally along the line 3—3 of FIG. 2, further illustrating the relationship between the clamp members when they are in their fully open position;

FIG. 4 is a side elevational view, generally similar to FIG. 3, illustrating two of a plurality of closed positions of the clamp members;

FIG. 5 is a sectional view, taken generally along the line 5—5 of FIG. 2, illustrating the relationship between the clamp members, a clutch assembly, and a clutch actuator assembly;

FIG. 6 is a plan view, taken generally along the line 6—6 of FIG. 5, illustrating the construction of the clutch actuator assembly;

DESCRIPTION OF ONE SPECIFIC PREFERRED EMBODIMENT OF THE INVENTION

General Description

Figure 7:
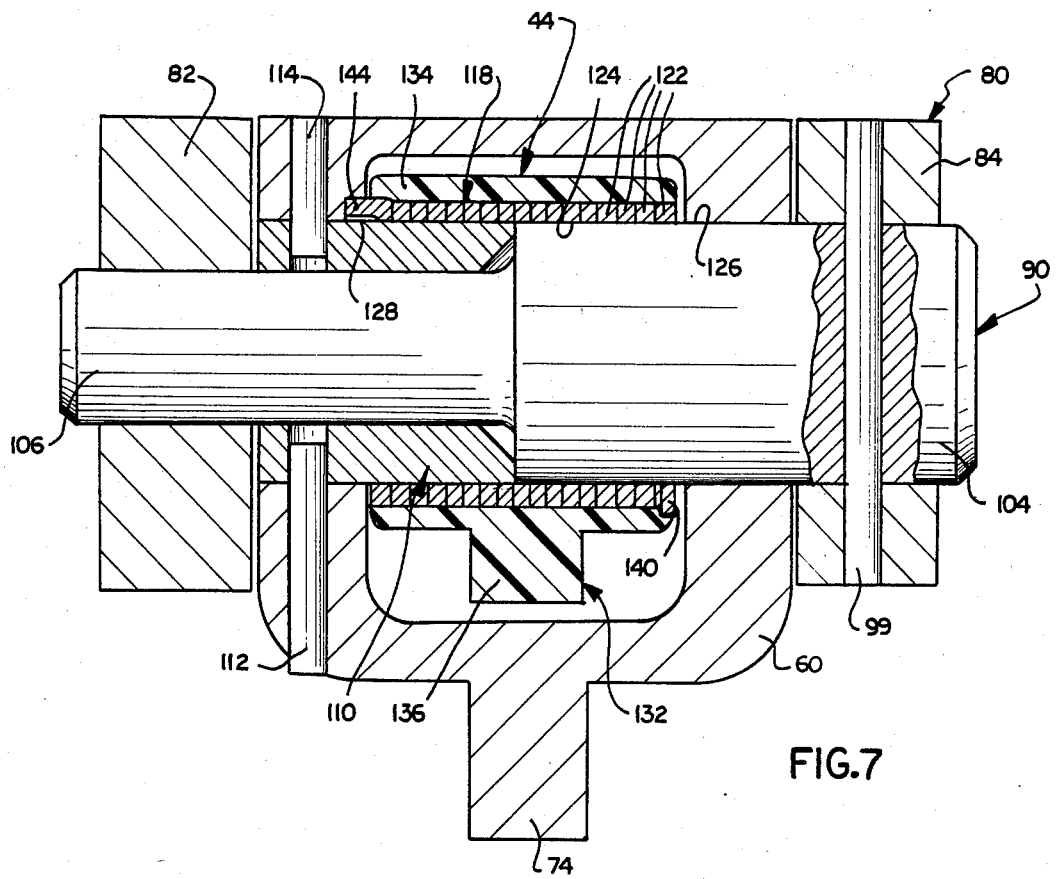
FIG. 7 is a sectional view, taken generally along the line 7—7 of FIG. 5, illustrating the construction of the clutch assembly.

A gripper assembly 10 constructed in accordance with the present invention is illustrated in FIGS. 1–3. The gripper assembly 10 includes a movable clamp member 12 which is rotatable relative to a stationary clamp member 14 to clampingly grip articles of different sizes between the clamp members. In order to firmly grip articles having different sizes, the movable clamp member 12 is rotatable from a fully open position illustrated in FIG. 3 to any one of a plurality of closed positions. Thus, the movable clamp member 12 is rotatable from the fully open position through a series of closed positions, including the closed position 16 illustrated in dashed lines in FIG. 4, to a closed position illustrated at 18 in solid lines in FIG. 4.

Rotation of the movable clamp member 12 toward the stationary clamp member 14 can be continued until the movable clamp member 12 abuttingly engages the stationary clamp member 14. It should be understood that although only two closed positions have been shown in FIG. 4, the movable clamp member 12 could be stopped in any closed position between the fully open position of FIG. 3 and a position in which the movable clamp member engages the stationary clamp member 14.

The extent of rotation of the movable clamp member 12 from the fully open position of FIG. 3 to a closed position is determined by an adjustable cam 24 (see FIG. 4). The gripper assembly 10 is moved toward the stationary cam 24 by a conveyor chain (indicated schematically at 28 in FIG. 4). The conveyor chain 28 could have any one of many known constructions, such as constructions shown in U.S. Pat. Nos. 3,880,276 or 4,294,345. However, it is preferred to have the conveyor chain 28 constructed in the manner disclosed in U.S. patent application Ser. No. 799,402 filed Nov. 19,1985 by Michael E. Winiaz and entitled "Conveyor Assembly".

As the gripper assembly 10 is moved toward the cam 24 with the gripper assembly in the fully open position, a roller 32 on an outwardly projecting arm 34 moves into engagement with a stationary side surface 36 on the cam 24 (see FIG. 4). Continued movement of the gripper assembly 10 toward the cam 24 forces the roller 32 downwardly to rotate the movable clamp member 12 in a counterclockwise direction (as viewed in FIGS. 3 and 4) from the fully open position. The extent of rotation of the clamp member 12 depends upon the location of the cam 24. Thus, if the cam is raised to the position shown in dashed lines at 38 in FIG. 4, the roller 32 is moved downwardly to the dashed line position shown in FIG. 4. This moves the clamp member 12 to the closed position illustrated in dashed lines at 16 in FIG. 4.

If the gripper assembly 10 is to clamp a relatively thin article, the movable clamp member 12 is rotated closer to the stationary clamp member 14. To accomplish this, the cam 24 is moved downwardly to the position indicated at 40 in solid lines in FIG. 4. Leftward (as viewed in FIG. 4) movement of the gripper assembly then ressults in the arm 34 being rotated downwardly to the solid line position shown in FIG. 4. As this occurs, the movable clamp member 12 rotates from the fully open position of FIG. 3 to the closed position illustrated at 18 in FIG. 4.

The position of the cam 24 can be adjusted both vertically and horizontally relative to the conveyor chain 28. Vertical adjustment of the cam 24 changes the closed position to which the movable clamp member 12 is rotated from the fully open position. Horizontal adjustment of the cam 24 changes the position at which the gripper assembly 10 is closed along its path of travel. Although the gripper assembly 10 has been described as being moved relative to a stationary cam 24 by a conveyor chain 28, it is contemplated that the gripper assembly could be connected with other devices and/or the cam moved relative to the gripper assembly.

In accordance with a feature of the present invention, a clutch or retainer assembly 44 (FIGS. 5 and 7) is operable to hold the movable clamp member 12 in any one of the numerous closed positions between the fully open position of FIG. 3 and a fully closed position in which the movable clamp member engages the stationary clamp member 14. Since the clutch assembly 44 is operable to hold the movable clamp member 12 in any one of a plurality of closed positions, the gripper assembly 12 can be used to clampingly grip articles of different sizes. To securely grip an article of a selected size, it is merely necessary to adjust the cam 24 to move the clamp member 12 to the desired position.

The clutch assembly 44 is operable between an engaged condition and a release condition by an actuator assembly 46 (FIGS. 5 and 6). When the clutch assembly 44 is in the engaged condition, the clutch assembly prevents rotation of the movable clamp member 12 from any one of the closed positions (FIG. 4) back toward the fully open position (FIG. 3). At a selected location along the path of movement of the gripper assembly 10 and conveyor chain 28, an outwardly projecting actuator lever 50 (FIGS. 5 and 6) engages is stationary abutment and is pivoted to operate the clutch 44 to a release condition. This releases the movable clamp member 12 for rotation from any one of the closed positions back to the fully open position.

When the clutch assembly 44 is released, the movable clamp member 12 is rotated to the fully open position by a biasing spring 52 (FIG. 5). The biasing spring 52 is of the leaf type and is formed from a flat piece of spring steel. A base 54 of the biasing spring 52 is fixedly connected with the stationary clamp member 14 while an upwardly (as viewed in FIG. 5) projecting end portion 56 (FIGS. 1 and 5) of the spring presses against the movable clamp member 12 to urge it toward the fully open position shown in FIGS. 3 and 5.

Clamp Members

The stationary clamp member 14 includes a one-piece cast metal base 60 (FIG. 5) which forms the base for the gripper assembly 10. A resilient gripper section 64 is connected to the rigid base 60 and flares upwardly (as viewed in FIGS. 1 and 2) and outwardly from the base 60. The gripper section 64 is formed of flat spring steel and is resiliently deflectable to apply clamping force against one side of an article when the gripper assembly 10 is in any one of its closed positions gripping an article.

Although the gripper assembly 10 could be used to grip many different types of articles, the gripper assembly is particularly well adapted to grip newspapers. A newspaper may have a center section which is formed of a relatively smooth paper having a surface with a low coefficient of friction. In order to hold the center section of the newspaper against movement relative to the outer sections of the newspaper, the gripping force applied to the newspaper is concentrated by gripper pads 66 and 68 (see FIG. 2) connected with the upper (as viewed in FIGS. 2 and 3) corner portions of the gripper section 64. The gripper pads 66 and 68 are located at corner portions of the outwardly flaring gripper section 64 to enable the concentrated clamp forces applied against a newspaper at widely spaced apart locations to hold a newspaper against pivotal movement relative to the gripper assembly 10 is.

The rigid base portion 60 of the clamp member 14 forms a housing for the clutch assembly 44 and actuator assembly 46. The base section 60 of the stationary clamp member 14 forms a base for the entire gripper assembly 10 and is provided with a pair of downwardly (as viewed in FIG. 5) projecting mounting sections 72 and 74 which are adapted to be connected with the conveyor chain 28 (FIG. 3) or other device. The lower end portion 54 of the leaf spring 52 is connected with the base section 60 of the stationary clamp member 14 and cooperates with the base section 60 to almost completely enclose the clutch assembly 44 to protect the clutch assembly from foreign material during use of the gripper assembly (FIG. 5).

The movable clamp member 12 includes a one-piece cast metal base 80 which is rotatably connected with the base 60 of the stationary clamp member 14. The rigid base 80 has a pair of mounting sections 82 and 84 (FIG. 2) which are disposed on opposite sides of the base 60 of the stationary clamp member 14. The mounting sections 82 and 84 are interconnected by a connector section 86.

A gripper actuator arm 34 extends outwardly from the mounting section 82 (FIGS. 2 and 3) and is cast as one piece with the base 80. A shaft 90 extends through the base section 60 of the stationary clamp member 14 and the mounting sections 82 and 84 of the base section 80 of the movable clamp member 12 to support the movable clamp member 12 for rotation relative to the stationary clamp member 14.

A resiliently deflectable gripper section 94 flares upwardly (as viewed in FIGS. 1 and 4) and outwardly from the base 80. The gripper section 80 is formed of flat spring steel and is resiliently deflectable to apply a clamping force against a side of an article. Thus, when the gripper assembly 10 is in any one of its closed positions, an article is clampingly gripped between the two gripper sections 64 and 94. The gripper sections 64 and 94 are resiliently deflectable to maintain substantially constant clamping forces against opposite sides of an article during movement of the gripper assembly 10.

A pair of gripper pads 98 and 100 are disposed on the upper corner portions of the gripper section 94 (FIGS. 1 and 2). The gripper pad 98 and 100 cooperate with the gripper pads 66 and 68 to apply concentrated clamping forces against relatively small areas on opposite sides of a gripped article. The gripper pads 98 and 100 are widely spaced apart, as are the gripper pads 66 and 68, so that the concentrated clamping forces are applied against the opposite sides of the article by the gripper pads at widely spaced apart locations. This results in the article being held against pivotal movement relative to the gripper assembly 10.

When the gripper assembly 10 in a closed condition, both of the gripper springs 64 and 94 are resiliently deflected. This results in resilient clamping forces being applied against opposite sides of the article. Since the clamping forces are concentrated at the gripper pads 66, 68, 98 and 100, the gripper assembly 10 can obtain a firm grip on an article and securely hold it during movement of the gripper assembly.

Clutch Assembly

When the clutch assembly 44 is in an engaged condition, the clutch assembly allows the movable clamp member 12 to rotate toward the stationary clamp member 14. The engaged clutch assembly 44 prevents rotation of the movable clamp member 12 in a direction away from the stationary clamp member 14. Therefore, the clutch assembly 44 holds the movable clamp member 12 in any position to which the movable clamp member is rotated by engagement with the cam 24. However, upon actuation of the clutch assembly 44 to the release condition, the movable clamp member 12 is rotated away from the stationary clamp member 14 by the biasing spring 52. This movement returns the movable clamp member 12 to the fully open position shown in FIGS. 2 and 3.

The clutch assembly 44 (FIG. 5) is operable to connect the base section 80 of the movable clamp member 12 with the base section 60 of the stationary clamp member 14. Thus, the shaft 90 has a cylindrical base section 104 (FIG. 7) which is fixedly connected with the base 80 of the movable clamp member 12 by a pin 99. A cylindrical hub 110 is disposed on a cylindrical mounting section 106 of the shaft 90. The hub 110 is fixedly connected with the base 60 of the stationary clamp member 14 by pins 112 at 114. Thus, upon rotation of the movable clamp member 12, the shaft 90 rotates with the movable clamp member relative to the stationary hub 110 and stationary clamp member 14.

In accordance with one of the features of the present invention, a helical coil spring 118 provides a positive one-way clutching action between the movable clamp member 12 and the stationary clamp member. The clutch spring 118 prevents rotation of the movable clamp member 12 from any one of a large number of closed positions back toward a fully open position until the actuator assembly 46 is operated. Since the clutch spring 118 is effective to prevent rotation of the movable clamp arm 12 back toward the open position from any closed position, the movable clamp member 12 can be moved to a closed position to engage articles of many different sizes by merely adjusting the position of the cam 24.

The spring 118 has a plurality of circular turns 122 (FIG. 7) which have a generally rectangular cross sectional configuration The helical spring turns 122 are disposed in abutting engagement to define a cylindrical inner side surface 124 of the coil spring 118. The cylindrical inner side surface 124 of the coil spring 118 is disposed in firm abutting engagement with a cylindrical outer side surface 126 on the base section 104 of the shaft 90 and with a cylindrical outer side surface 128 on the hub 110. The cylindrical outer side surfaces 126 and 128 on the shaft 90 and hub 110 have the same diameter and are disposed in a coaxial relationship.

The inner side surface 124 of the coil spring 118 has a relaxed or free diameter which is slightly smaller than the diameter of the outer side surface 126 of the shaft 90 and the outer side surface 128 of the hub 110. This results in an interference fit or slight flexing of the turns 122 of the coil spring 118 when the spring is telescoped over the hub 110 and base section 104 of the shaft 90. The initial flexing of the turns of the helical spring eliminates any backlash in the clutch assembly 44.

Since the clutch assembly 44 is free of backlash, once the movable clamp member 12 has been moved away from the fully open position of FIG. 3 to any one of the closed positions by the cam 24 (FIG. 4), the movable clamp member 12 does not rotate back toward the fully open position. This results in the clamp members 12 and 14 maintaining a firm grip on an article after the gripper assembly 10 has been moved out of engagement with the cam 24. If there was even a slight backlash in the clutch assembly 44, the force applied against a gripped article would be reduced with a resulting tendency for the article to slip out of the gripper assembly 10.

A collar 132 (FIGS. 5 and 7) circumscribes the coil spring 118. The collar 132 has a cylindrical body portion 134 which engages the outer side surface on the turns 122 (FIG. 7) of the coil spring. A downwardly extending arm or tang 136 on the collar 132 is engageable by the actuator assembly 46 (FIG. 5) to operate the clutch assembly 44 from the engaged condition to the release condition. An end 140 (FIG. 7) of the clutch spring 118 extends into a notch formed in the collar 132. An opposite end 144 of the spring 118 extends into a notch formed in the base 60. Thus, one axial end portion of the spring 118 is connected with the collar 132 while the opposite axial end of the spring is connected with the base 60 of the stationary clamp member 14. The spring 118 is connected with the movable clamp member 12 only by frictional engagement between the inner side surface 124 of the spring with the outer side surface 126 of the shaft 90.

During rotation of the movable clamp member 12 from the fully open position, friction forces are applied to the turns 122 of the coil spring 118 by the outer side surface 126 of the shaft 90. The helical turns 122 of the coil spring 118 are wrapped in such a manner that frictional forces applied to the inner side surface 124 of the coil spring by the outer side surface 126 of the shaft 90 tend to flex the turns of the coil spring to increase the diameter of the coil spring. Therefore, the only gripping action between the turns 122 of the coil spring 118 and the shaft 90 during rotation of the movable clamp member 12 away from the fully open position is a sliding friction force between the inner side surface 124 of the coil spring 118 and the coaxial outer side surface 126 of the shaft 90.

Figure 8:
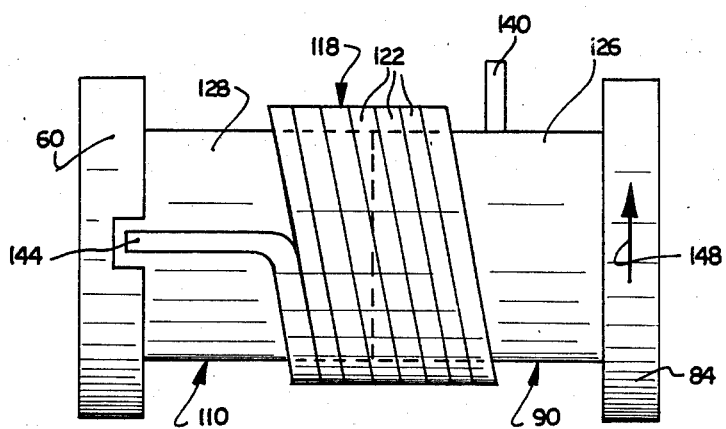
FIG. 8 is a schematic illustration depicting the relationship between a clutch spring and surfaces connected with the movable and stationary clamp members.

When rotation of the movable clamp member 12 away from the fully open position is stopped, the force of the biasing spring 52 and reaction forces due to the clamping of an article urge the clamp member 12 to rotate back toward the fully open position. The turns of the coil spring 118 are wrapped so that any tendency for the movable clamp member 12 to rotate back toward the fully open position results in firm gripping forces between the coil spring 118 and both the shaft 90 and hub 110. Since the hub 110 is fixedly connected with the base 60 of the stationary clamp member 14, the coil spring 118 holds the movable clamp member 12 against any movement back toward the fully open position The direction in which the turns 122 of the coil spring are wrapped relative to the coaxial hub 110 and shaft 90 is illustrated schematically in FIG. 8. When the shaft 90 is being rotated in the direction of the arrow 148, that is in a direction opposite to the direction in which the turns 122 of the spring 118 are wrapped, the frictional forces between the outer side surface 126 of the shaft 90 and the inner side surface 124 of the coil spring 118 tend to flex the turns of the coil spring in a direction to increase the diameter of the turns of the coil spring. The direction indicated by the arrow 148 corresponds to the direction in which the shaft 90 is rotated during closing movement of the clamp member 12. Therefore, the turns 122 of the coil spring 118 do not grip the shaft 90 as the movable clamp member 12 moves toward the stationary clamp member 14.

When the direction of rotation of the shaft 90 is opposite from that indicated by the arrow 148 (FIG. 8), the direction of rotation of the shaft 90 is in the same direction as in which the turns 122 of the coil spring are wrapped. At this time the friction force between the shaft 90 and the turns 122 of the coil spring 118 tend to flex the turns in a direction to decrease the diameter of the coil spring. This results in a firm gripping action between the coil spring 118 and both the outer side surface 126 of the rotatable shaft 90 and the outer side surface 128 of the stationary hub 110. Therefore the spring 118 firmly interconnnects the shaft 90 and the hub 110 to hold them against rotation relative to each other in a direction opening the gripper assembly 10.

Actuator Assembly

The actuator assembly 46 operates the clutch assembly 44 from an engaged condition in which the spring 118 firmly grips both the shaft 90 and hub 110 to a release condition in which the shaft 90 is rotatable relative to the hub. To accomplish this, the actuator assembly 46 applies a force against the downwardly (as viewed in FIGS. 5 and 7) extending shoulder 136 on the collar 132. The force applied against the shoulder 136 rotates the collar 132 in a direction tending to increase the diameter of the coil spring 118, that is in a direction opposite to the direction in which the turns 122 of the coil spring are wrapped. This results in the turns 122 of the coil spring 118 being flexed slightly to release their grip on the base end portion 104 (FIG. 7) of the shaft 90 and on the hub 110. Once this is accomplished, the biasing spring 52 can rotate the clamp member 12 back to its fully open position.

The actuator assembly 46 includes a lever 50 (FIG. 6) which is pivotally supported on the base section 60 of the stationary clamp member 14 by a pin 152. Upon engagement of the lever 150 with a stationary abutment to effect an opening of the gripper assembly 10, the actuator lever is rotated in a counterclockwise direction (as viewed in FIG. 6). This causes a cam surface 154 on the lever 50 to press a pin 156 against the downwardly extending shoulder 136 on the collar 132. As the shoulder 136 is rotated in a counterclockwise direction (as viewed in FIG. 5) by the pin 156, the clutch assembly 44 is released.

After the actuator lever 50 has moved out of engagement with the stationary abutment, a biasing spring 160 moves the pin 156 out of engagement with shoulder 136 on the collar 132. This enables the natural resilience of the spring 118 to return the clutch assembly 44 to its release condition. Of course, the position of the abutment which moves the actuator lever 50 may be changed relative to the conveyor chain 28 to enable the position at which the gripper assembly 10 is opened to be changed.

Operation

When the gripper assembly 10 is to engage an article, a conveyor chain 28 moves the gripper assembly to a pickup station with the gripper assembly in the fully open position of FIG. 3. As the gripper assembly approaches the position in which it is to grip an article, the roller 32 on the actuator arm 34 moves into engagement with the cam 24. Continued movement of the gripper assembly 10 causes the cam 24 to rotate the movable clamp member 12 in a counterclockwise direction (as viewed in FIG. 3) from a fully open position to any one of a plurality of closed positions, such the closed positions 16 or 18 of FIG. 4.

As the movable clamp member 12 moves toward a closed position, the shaft 90 rotates relative to the coil spring 118 and to the hub 110 (FIG. 7). As this occurs, the friction force between the outer side surface 126 on the shaft 90 and the inner side surface 124 of the helical spring 118 tends to expand the spring. Therefore, the spring 118 is ineffective to grip shaft 90 and hub 110 to hold the shaft against rotation.

When the gripper actuator arm 34 moves clear of the cam 24, the movable clamp member 12 will be in a closed position corresponding to the vertical position of the cam 24. At this time, an article will be firmly gripped between the movable and stationary clamp arms 12 and 14. The clutch assembly 44 prevents any rotation of the movable clamp arm 12 back toward the fully open position. The conveyor 28 is then operated to move the gripper assembly to a receiving station where the article is to be deposited.

As the gripper assembly 10 moves toward the receiving station, a firm grip is maintained on the article. To this end, the pads 66, 67, 98 and 100 apply concentrated clamping forces against relatively small areas on opposite sides of the gripped article. Since the clamping forces are applied against widely spaced areas on each side of the gripped article, the article cannot work loose as it is being transported.

At the receiving station, the actuator lever 50 moves into engagement with a stationary stop or abutment member. Engagement of the actuator lever 50 with the stationary abutment member causes the actuator lever to rotate in a counterclockwise direction (as viewed in FIG. 5). This results in the pin 156 being pressed against the shoulder 136 on the collar 132 to apply a force to the coil spring tending to open or increase the diameter of the turns 122 of the coil spring. As this occurs, the grip of the coil spring 118 on the shaft 90 and collar 110 is released to enable the biasing spring 54 (FIG. 5) to rotate the movable clamp member 12 from a selected closed or gripping position back to its fully open position. As the gripper assembly 10 opens, the article is deposited at the receiving station.

Continued operation of the conveyor 28 and movement of the gripper assembly 10 causes the actuator lever 50 to move out of engagement with the stationary abutment. As this occurs, the spring 160 presses the pin 156 against the lever 50 to pivot the lever back to the position shown in FIG. 6. This releases the collar 132 so that the clutch spring 118 returns to its engaged condition.

Summary

In view of the foregoing description, it is apparent that the present invention relates to a gripper assembly 10 having a releasable clutch 44 which prevents rotation of a movable clamp member 12 from any one of a plurality of closed positions to a fully open position. The clutch 44 is operated from an engaged condition to a release condition by an actuator assembly 46. When the clutch 44 is in the release condition, the movable clamp member 12 is rotatable from any one of the plurality of closed positions back toward the fully open position of FIG. 3.

The clutch 44 includes a coil spring 118 which allows the movable clamp member 12 to rotate in a direction away from the fully open position to any one of a plurality of closed positions. When the movable clamp member has been rotated to a closed position, turns 122 of the coil spring grip a surface 126 connected with the movable clamp member 12 to hold it against movement back toward the fully open position. When an engaged article is to be released, the actuator assembly 46 applies a force to the spring 118 in a direction tending to increase the size of the turns 122 of the spring to thereby release the movable clamp member.

The movable and stationary clamp members both have resiliently deflectable gripper sections 64 and 94 which flare outwardly from rigid base sections 60 and 80. To enable the gripper assembly 10 to securely grip an article, such as a newspaper, clamping forces are concentrated at corner portions of the resilient gripper sections by gripper pads 66, 68, 98 and 100. This enables the gripper assembly 10 to securely grip an article, such as a newspaper, with a relatively large force at spaced apart locations on the article.

Having described one specific preferred embodiment of the invention, the following is claimed:

1. A gripper assembly for clampingly gripping articles, said gripper assembly comprising a first clamp member, a first surface area connected with said first clamp member, a second clamp member rotatable relative to the first clamp member from a fully open position to any one of a plurality of closed positions to enable articles of different sizes to be gripped between said clamp members, a second surface area connected with said second clamp member, and releasable retainer means operable between an engaged condition preventing rotation of said second clamp member from any one of the plurality of closed positions to the fully open position and a release condition in which said second clamp member is rotatable from any one of the plurality of closed positions to the fully open position, said retainer means including a coil spring having a plurality of turns, said turns of said coil spring including inner side surface means for gripping said first and second surface areas when said retainer means is in the engaged condition to prevent rotation of said second clamp member toward the fully open position, said inner side surface means of said coil spring and one of said surface areas being rotatable relative to each other when said retainer means is in the release condition to enable said second clamp member to rotate toward the fully open position.

2. A gripper assembly as set forth in claim 1 wherein said first and second surface areas have a cylindrical configuration and are coaxial with the axis of rotation of said second member, said inner side surface means of said coil spring having a cylindrical configuration and being disposed in a coaxial relationship with said first and second surface areas.

3. A gripper assembly as set forth in claim 2 further including actuator means for operating said retainer means from the engaged condition to the release condition, said actuator means including means for urging the turns of said coil spring to flex in a direction tending to increase the diameter of said inner side surface means of said coil spring.

4. A gripper assembly as set forth in claim 1 wherein the turns of said coil spring are wrapped around said first and second surface areas in a direction which is the same as the direction of rotation of said second clamp member from one of the closed positions to the fully open position.

5. A gripper assembly as set forth in claim 1 wherein at least one of said first and second surface areas applies a friction force to said inner side surface means of said coil spring in a direction tending to increase the size of the turns of said coil spring upon rotation of said second clamp member from the fully open position toward one of the closed positions.

6. A gripper assembly as set forth in claim 1 further including a collar circumscribing said coil spring, a first end of said coil spring being connected with said collar and a second end of said coil spring being connected with said first clamp member, and actuator means for operating said retainer means from the engaged condition to the release condition, said actuator means including means for rotating said collar relative to said first clamp member.

7. A gripper assembly as set forth in claim 1 further including a shaft connected with said second clamp member for rotation therewith relative to said first clamp member, said shaft having a first portion with a relatively large cylindrical outer side surface and a second portion with a relatively small outer side surface, said second surface area being disposed on said first portion of said shaft, a hub section connected with said base and circumscribing the second portion of said shaft, said hub section having a cylindrical outer side surface which forms said first surface area and is coaxial with and of the same diameter as the cylindrical outer side surface of said first portion of said shaft, said inner side surface of said coil spring being disposed in engagement with the outer side surfaces of said hub section and the first portion of said shaft, a first end portion of said coil spring being connected with said first clamp member, a collar circumscribing at least a portion of said coil spring, a second end portion of said coil spring being connected with said collar, said cylindrical outer side surface of said first portion of said shaft being slidable relative to the inner side surface of said coil spring upon rotation of said first clamp member from the fully open position to any one of the closed positions, said inner side surface of said coil spring gripping the cylindrical outer side surfaces of said hub section and the first portion of said shaft to hold said second clamp member against rotation from one of the closed positions back to the fully open position to enable said first and second clamp members to maintain a secure grip on an article, and actuator means for applying force to said collar in a direction to increase the size of the inner side surface of said coil spring to release the grip of the inner side surface of said coil spring on the outer side surfaces of said hub section and the first portion of said shaft to allow said second clamp member to rotate from one of the closed positions back to the fully open position.

8. A gripper assembly for clampingly gripping articles, said gripper assembly comprising a first clamp member, said first clamp member including a first rigid base section and a first resiliently deflectable gripper section connected with said first base section, a second clamp member rotatable relative to the first clamp member from a fully open position to any one of a plurality of closed positions to enable articles of different sizes to be gripped between said clamp members, said second clamp member including a second rigid base section which is rotatable relative to said first rigid base section of said first clamp member and a second resiliently deflectable gripper section which is fixedly connected with said second rigid base section of said second clamp member and which cooperates with said first resiliently deflectable gripper section of said first clamp member to grip an article when said second clamp member is in one of said plurality of closed positions, means for rotating said second clamp member relative to said first clamp member, a shaft connected with said second rigid base section of said second clamp member for rotation therewith relative to said first rigid base section of said first clamp member, said shaft having a first portion with a relatively large cylindrical outer side surface and a second portion with a relatively small outer side surface, a hub section connected with said first rigid base section of said first clamp member and circumscribing the second portion of said shaft, said hub section having a cylindrical outer side surface which is coaxial with and of the same diameter as the cylindrical outer side surface of said first portion of said shaft, clutch means for gripping the cylindrical outer side surfaces of said hub section and the first portion of said shaft to hold said second clamp member against rotation from one of the closed positions back to the fully open position to enable said first and second clamp members to maintain a secure grip on an article, said clutch means being disposed in engagement with the outer side surfaces of said hub section and said first portion of said shaft, a first portion of said clutch means being connected with said first rigid base section of said first clamp member, a second portion of said clutch means being connected with said second rigid base section of said second clamp member, said cylindrical outer side surface of said first portion of said shaft being slidable relative to said clutch means upon rotation of said first clamp member from the fully open position to any one of the closed positions, and actuator means for applying force to said clutch means to release the grip of said clutch means on the outer side surfaces of said hub section and the first portion of said shaft to allow said second clamp member to rotate from one of the closed positions back to the fully open position.

9. A gripper assembly as set forth in claim 8 further including biasing spring means for urging said second clamp member to rotate relative to said first clamp member from one of the closed positions to the fully open position, said biasing spring means including a leaf spring having a first end portion connected with one of said rigid base sections of said clamp members and a second end portion engaging the rigid base section of the other one of said clamp members.

10. A gripper assembly as set forth in claim 8 wherein said first resiliently deflectable gripper section includes a pair of corner portions flaring outwardly from said first base section, first force concentrating means disposed at one of said corner portions of said first resiliently deflectable gripper section and second force concentrating means disposed at the other corner portion for applying force against two relatively small areas on one side of the gripped article, said second resiliently deflectable gripper section including a pair of corner portions flaring outwardly from said second base section, third force concentrating means disposed at one of said corner portions of said second resiliently deflectable gripper section for applying force against a relatively small area on a side of the gripped article at a location opposite said first force concentrating means, and fourth force concentrating means disposed at the other corner portion of said second resiliently gripper section for applying force against a relatively small area on a side of the gripped article at a location opposite said second force concentrating means.

11. A gripper assembly as set forth in claim 8 wherein said clutch means includes a coil spring having an inner side surface in engagement with outer side surfaces of said hub and said first portion of said shaft, a first end portion of said coil spring connected with said first rigid base section of said first clamp member, a collar circumscribing at least a portion of said coil spring, a second end portion of said coil spring being connected with said collar, said actuator means for applying force to said collar in a direction to increase the size of the inner side surface of said coil spring to release the grip of the inner side surface of said coil spring on the outer side surfaces of said hub and said first portion of said shaft.

* * * * *